(12) United States Patent
Kehl et al.

(10) Patent No.: US 12,477,171 B2
(45) Date of Patent: Nov. 18, 2025

(54) SYSTEM AND METHOD FOR VIDEO ON VIDEO OVERLAY

(71) Applicant: Google LLC, Mountain View, CA (US)

(72) Inventors: Roland Kehl, Dübendorf (CH); Pawel Zuczek, Rudolfstetten (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/289,645

(22) PCT Filed: Dec. 15, 2022

(86) PCT No.: PCT/US2022/052984
§ 371 (c)(1),
(2) Date: Nov. 6, 2023

(87) PCT Pub. No.: WO2024/129082
PCT Pub. Date: Jun. 20, 2024

(65) Prior Publication Data
US 2025/0088702 A1  Mar. 13, 2025

(51) Int. Cl.
*H04N 21/431* (2011.01)
*G06N 3/08* (2023.01)
*H04N 21/234* (2011.01)

(52) U.S. Cl.
CPC ........... *H04N 21/4316* (2013.01); *G06N 3/08* (2013.01); *H04N 21/23418* (2013.01)

(58) Field of Classification Search
CPC . H04N 21/4316; H04N 21/23418; G06N 3/08
See application file for complete search history.

(56) References Cited

U.S. PATENT DOCUMENTS

| | | | |
|---|---|---|---|
| 2008/0231751 A1 | 9/2008 | Zalewski | |
| 2011/0075992 A1 | 3/2011 | Mei et al. | |
| 2014/0359656 A1* | 12/2014 | Banica | H04N 21/234 725/32 |
| 2017/0278289 A1* | 9/2017 | Marino | G06T 7/536 |

(Continued)

FOREIGN PATENT DOCUMENTS

| | | |
|---|---|---|
| JP | 2001313897 A | 11/2001 |
| JP | 2013150050 A | 8/2013 |
| WO | 2022025883 A1 | 2/2022 |

OTHER PUBLICATIONS

International Search Report and Written Opinion for International Application No. PCT/US2022/052984 dated Mar. 30, 2023. 14 pages.

(Continued)

*Primary Examiner* — Kyu Chae
(74) *Attorney, Agent, or Firm* — Lerner David LLP

(57) ABSTRACT

A second video may be overlaid on or inserted in a first video in a non-obstructive manner. A location for the second video within the first video may be determined based on analyzing non-essential locations in sequential frames in the first video. The second video may be selected from a plurality of candidate videos based on parameters of the second video, such as size, duration, context, etc. Accordingly, the second video may be displayed simultaneously with the first video by nesting the second video within the first video, while providing a streamlined viewing experience and minimizing distraction.

19 Claims, 16 Drawing Sheets

(56) References Cited

U.S. PATENT DOCUMENTS

2020/0154157 A1* 5/2020 Smith .................. H04N 21/812
2021/0390673 A1* 12/2021 Ban .......................... G06T 5/20
2022/0368979 A1* 11/2022 Zhang .................... G06V 20/41
2023/0005159 A1* 1/2023 Dal Zotto ............... G06T 7/254

OTHER PUBLICATIONS

Office Action for European Patent Application No. 22854202.3 dated Aug. 22, 2024. 5 pages.
International Preliminary Report on Patentability for International Application No. PCT/US2022/052984 dated Jun. 26, 2025. 8 pages.
Office Action for Japanese Patent Application No. 2023-575930 dated Mar. 11, 2025. 5 pages.
Office Action for Japanese Patent Application No. 2023-575930 dated Sep. 30, 2025. 4 pages.

* cited by examiner

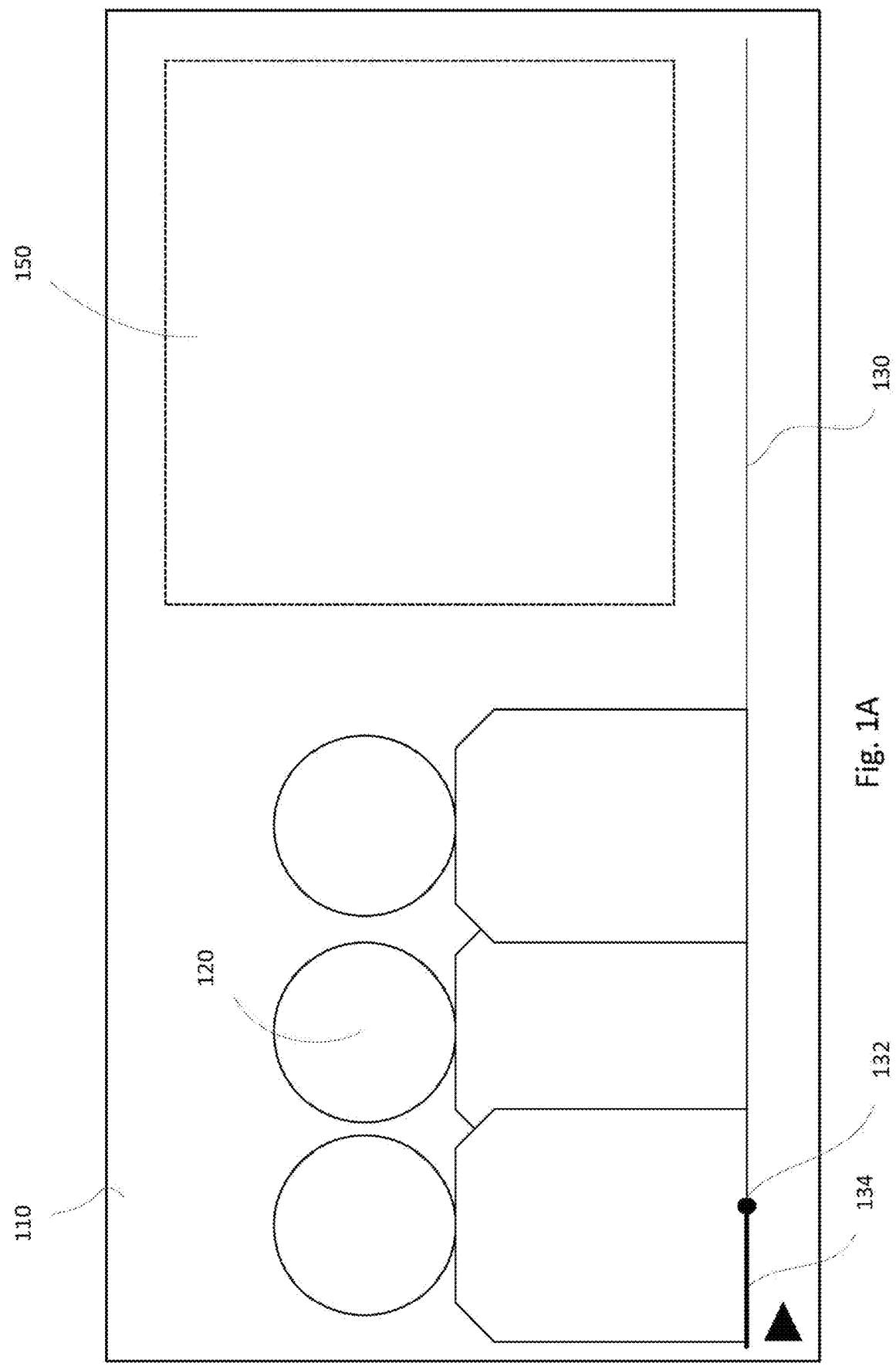

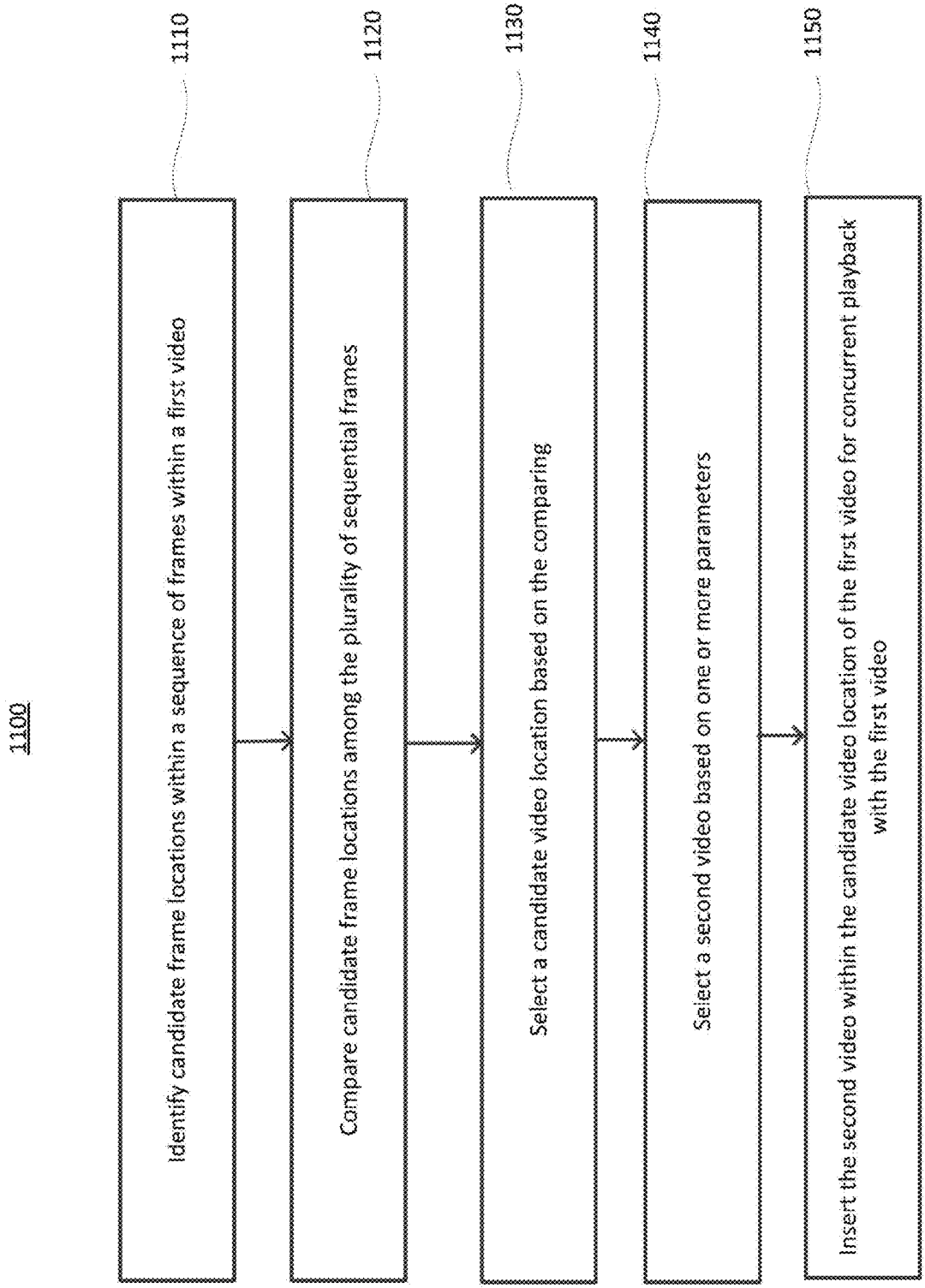

SYSTEM AND METHOD FOR VIDEO ON VIDEO OVERLAY

CROSS-REFERENCE TO RELATED APPLICATIONS

This application is a national phase entry under 35 U.S.C. § 371 of International Application No. PCT/US2022/052984, filed Dec. 15, 2022, the disclosure of which is hereby incorporated herein by reference.

BACKGROUND

Video advertisements are often placed before a start of a video or after an end of the video. Sometimes the advertisements are placed intermittently throughout the video by interrupting the video to present the advertisement and resuming the video once the advertisement is completed. This interruption disrupts the watcher's viewing experience and gives the viewer an opportunity to abandon watching the video altogether or ignore the advertisement until the video resumes. This creates frustration for the user and a stunted viewing experience.

SUMMARY

The present disclosure provides for overlaying a second video, such as a video advertisement, on a first video playing a viewer's desired content. The first and second videos may play concurrently. The placement of the second video within the first video may be determined by analyzing locations within the first video to select the most non-distracting place to overlay the second video. Such analysis may include a comparison of sequential frames, and identifying locations with minimal changes and without depicting particular objects, such as humans, animals, etc. Such locations may be candidate locations for the second video, and may each have an associated set of parameters such as size, length of time, context of content in relevant frames of the first video, etc. The second video may be selected based on one or more of such parameters.

One aspect of the disclosure provides a method of placing a second video within a first video. The method may include identifying, with one or more processors, candidate frame locations within a sequence of frames within the first video, comparing, with the one or more processors, the candidate frame locations among the frames in the sequence of frames, selecting, with the one or more processors, a candidate video location based on the comparing, the candidate video location comprising a frame location that is consistent among the candidate frame locations in the sequence of frames, selecting a second video, based on one or more parameters associated with the candidate video location, and inserting the second video within the candidate video location of the first video for concurrent playback with the first video. Identifying the candidate frame locations may include identifying two-dimensional locations wherein a difference between content displayed in a first frame in the two-dimensional location and content displayed in a second frame in the two-dimensional location is below a threshold. The method may further include splitting each frame into a grid comprising a plurality of cells, wherein the two-dimensional locations comprise a subset of the plurality of cells.

According to some examples, identifying the candidate frame locations may include, for each frame, computing a local average value for every pixel, for each row of the frame storing a longest line length where the local average value remains above a first threshold, and for each column of the frame, storing a largest rectangle where the local average value remains above a second threshold. The method may further include identifying the stored rectangles having an area larger than a minimum area required by the second video. The method may further include identifying one or more sequences of stored rectangles having a continuous location in the first video across at least N consecutive frames. Moreover, the method may include computing a weight for each sequence of stored rectangles, wherein selecting the candidate video location is based on the weight.

According to some examples, the method may further include storing the candidate video location, and dynamically selecting the second video during playback of the first video based on at least one of size or duration of the candidate video location.

The second video may be selected from a plurality of candidate videos based on a duration of the candidate video location in the sequence of frames and a duration of the second video.

According to some examples, the method may further include identifying a context of the first video, and selecting the second video from a plurality of candidate videos based on a context of the second video corresponding to the identified context of the first video.

According to some examples, the method may further include annotating the first video with a first tag corresponding to the identified context, wherein selecting the second video comprises identifying a second tag for the second video that overlaps with the first tag. Such annotating of the first video with a first tag may include annotating the first video with tags relevant to an entirety of the first video. In other examples, such annotating of the first video with a first tag may include annotating the first video with tags relevant to individual moments or frames within the first video.

According to some examples, the method may further include comparing the candidate frame locations comprises executing a machine learning model. Training the machine learning model may include collecting training samples, the training samples comprising a set of frames in the first video that contain annotated sequences of non-essential areas, and inputting the training samples to a deep-neural network classifier, thereby training the classifier to assess for each point on the set of frames how likely each point is a non-essential location. The machine learning model may be trained to identify the existence of a human in the video, and to exclude locations in a frame that include the human from the candidate frame locations.

Another aspect of the disclosure provides a system comprising memory and one or more processors in communication with the memory. The one or more processors may be configured to identify candidate frame locations within sequence of frames within the first video, compare the candidate frame locations among the frames in the sequence of frames, select a candidate video location based on the comparing, the candidate video location comprising a frame location that is consistent among the candidate frame locations in the sequence of frames, select a second video based on one or more parameters associated with the candidate video location, and insert the second video within the candidate video location of the first video for concurrent playback with the first video.

The candidate frame locations may comprise two-dimensional locations wherein a difference between content displayed in a first frame in the two-dimensional location and content displayed in a second frame in the two-dimensional location is below a threshold. In identifying candidate frame locations, the one or more processors may be further configured to, for each frame, compute a local average value for every pixel. For each row of the frame, the one or more processors may store a longest line length where the local average value remains above a first threshold, and for each column of the frame, store a largest rectangle where the local average value remains above a second threshold.

The second video may be selected from a plurality of candidate videos based on a duration of the candidate video location in the sequence of frames and a duration of the second video.

Another aspect of the disclosure provides a non-transitory computer-readable medium storing instructions executable by one or more processors for performing a method. Such method may include identifying candidate frame locations within a sequence of frames within the first video, comparing the candidate frame locations among the frames in the sequence of frames, selecting a candidate video location based on the comparing, the candidate video location comprising a frame location that is consistent among the candidate frame locations in the sequence of frames, selecting a second video, based on one or more parameters associated with the candidate video location, and inserting the second video within the candidate video location of the first video for concurrent playback with the first video.

DESCRIPTION OF DRAWINGS

FIGS. 1A-B depict examples of candidate frame locations in various frames of a first video according to aspects of the disclosure.

FIG. 11 is a flow diagram illustrating an example method according to aspects of the disclosure.

DETAILED DESCRIPTION

Figure 1B:
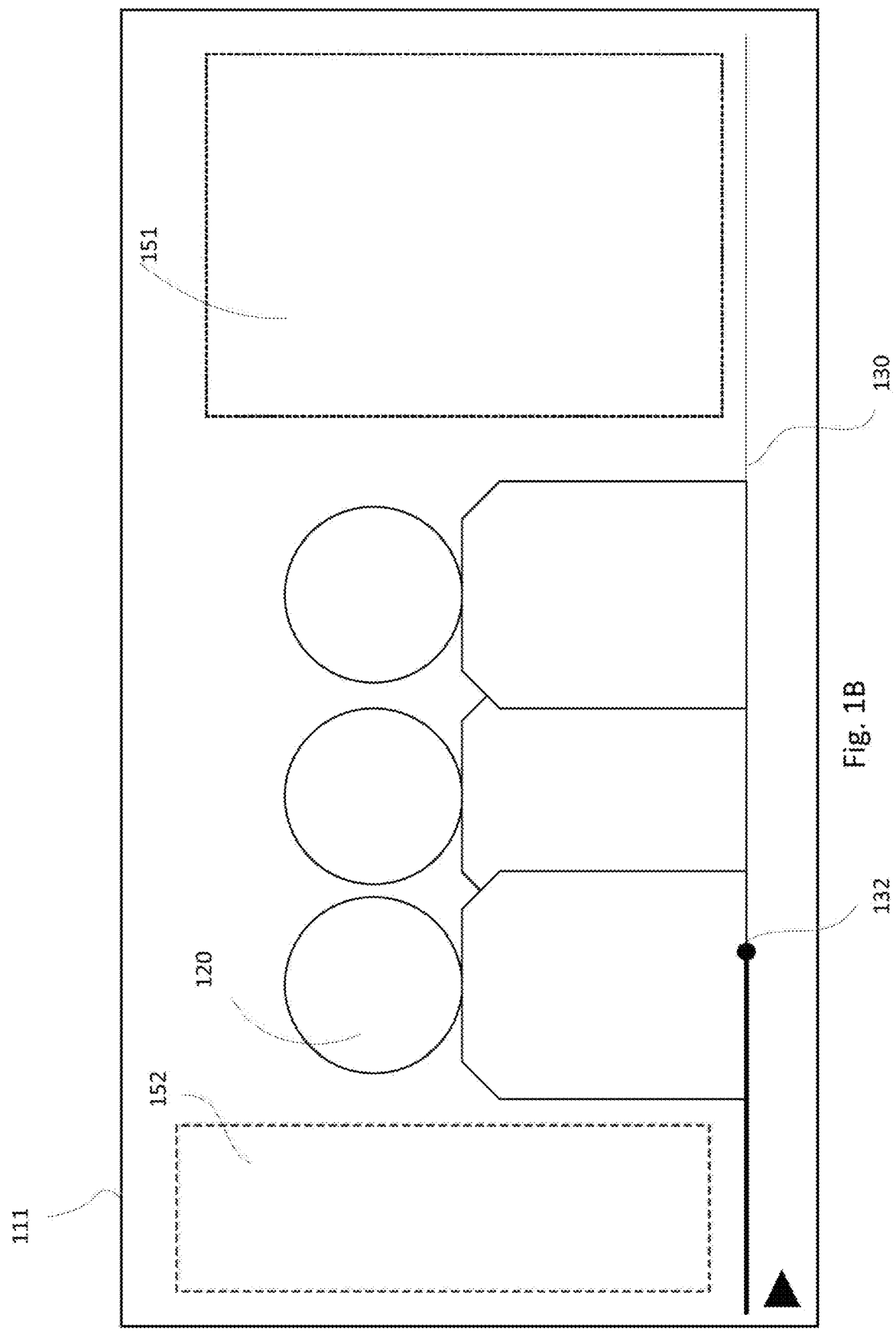

The present disclosure relates generally to overlaying one video on another video in a non-obstructive manner. The disclosure provides a system and method of identifying candidate regions within a first video. The disclosure further provides a system and method for selection of a second video to overlay on the first video based on the identified candidate regions.

In determining when and where to overlay the second video on the first video, a frame range within the first video may be selected for placement of the second video, and a two-dimensional location on the frames within the frame range may be selected. Selection of the frame range and frame location may be performed using a low user disturbance approach. Additionally or alternatively, selection of the frame range and frame location may be performed using a contextual moment selection approach.

In the low user disturbance approach, video locations are identified as being non-essential to a viewer. For example, the non-essential locations may be locations that are minimally or non-obstructive of content in the first video that the viewer likely wants to see. For example, if the first video depicts a human playing soccer, a non-essential location may be one that does not obstruct the human, the ball, or the goal, but may instead overlay on depictions of a sky, turf, etc. According to some examples, the non-essential locations may be scored based on how obstructive or distracting they are, with better scores correlating to less obstructive or distracting.

Computing candidate frame locations, such as non-essential areas within individual frames, may be performed using various techniques, such as a static content detection approach, a machine learning approach, a hybrid approach, etc.

According to the static content detection approach, given a sequence of video-frames, differences are computed between consecutive video frames. Each resulting frame may be split into a grid, and an aggregate difference between the consecutive frames is computed for each cell in the grid.

According to the machine learning approach, a set of video frames are selected to serve as training samples. The frames can be selected randomly or based on varying features, etc. Each of the selected video frames may be manually reviewed to identify candidate frame locations or non-essential locations. Such candidate frame locations may be annotated. In other examples, training sample videos may be manually reviewed in segments or their entirety to identify sequences of non-essential areas, or candidate video locations, and those locations may be annotated. The annotated frames and/or videos may be used to train a deep neural-network classifier to assess, for each point on a frame, how likely the point is to be a non-essential location.

According to the hybrid approach, machine learning models may be used to provide additional information. For example, machine learning models may be trained to identify essential elements of the first video, and any locations including such essential elements may be excluded from consideration as a candidate location for the second video. For example, one possible heuristic is that people are an essential element of the first video. A classifier may compute a probability that each position within a frame contains a human.

As a result of any of the approaches above, locations within frames or video segments may be scored or weighted. For example, a weight may be assigned to each cell of the grid, to each pixel, or to areas of the frame defined in any other way. The weights may correspond to a likelihood of the area being non-essential, such as non-obstructing or non-distracting for placement of the second video. According to some examples, weighted results from different methods may be combined.

Candidate video locations for the second video may be identified within the first video using the candidate frame locations. For example, computed weights for each pixel, cell, or other area may be used to compute a local average value for every pixel, cell, or other area of the frame. This may blur the image and make the determination of candidate locations less susceptible to noise. For each row of the frame, a longest line length where the local average value does not drop below a first threshold may be stored. For each column of the frame, a largest rectangle where the local average value does not drop below a second threshold may be stored. For each frame, N largest rectangles based on such computation may be stored.

According to some examples, candidate video locations may be selected based on requirements of the second video. For example, such requirements may include size, length, etc. Candidate frame locations may be selected that are larger than a minimum area required by the second video, have a continuous location in the first video for at least a minimum number of frames corresponding to a duration of the second video, etc. For each sequence of candidate frame locations, a weight may be computed as an average weight of all areas covered by the candidate frame locations in all frames of the sequence. From those sequences, for each size/duration pair, the sequence that best fits the second video criteria while having the highest weight may be selected as the video location for the second video. The selected video locations may be stored for retrieval during playback, such that the second video may be dynamically selected, retrieved, and inserted in the first video.

Contextual moment selection may include identifying a context for particular frames in which the second video will be inserted, and correlating such context with a context of the second video. For example, the frames of the first video may be annotated with relevant context tags. Such context tags may indicate the content in the frame is relevant to a particular theme, subject matter, object, etc. For example, the context tags can indicate that the frame is relevant to a particular sport, action, product, state of mind, etc. The second video may also have relevant tags assigned. Corresponding tags between the first video frames and the second video may be identified, and the second video may be selected for insertion in the first video based on such corresponding tags. Such corresponding tags may be overlapping, such as if some subset of the tags match between the first video frames and the second video. In another example, such corresponding tags may be complementary, such as if the first video context tag included food and the second video tag included dining room décor.

FIG. 1A illustrates an example video frame 110 of a first video. The video frame 110 may be one of a plurality of sequential frames that together form the first video. Each frame 110 may include content 120, such as objects, people, or other features depicted in a video. A video progress bar 130 may indicate a length or duration of the first video, and a point in time within the duration that corresponds to a video frame being viewed at a given moment. For example, progress indicator 132 may move from one end of the progress bar 130, such as a left end, to the other end. In some examples, as the progress indicator 132 advances, completion indicator 134 may follow to indicate which portions of the video have already been viewed. For example, the completion indicator 134 may turn the progress bar 130 a different color, shape, thickness, etc. for portions of the progress bar 130 corresponding to frames that are prior to the frame 110 corresponding to the progress indicator 132.

A first candidate frame location 150 for the video frame 110 may be identified. The candidate frame location 150 may correspond to a non-essential, non-obstructive, or non-distracting area in the frame. For example, such are may be an area that does not significantly overlap with the main features in the content 120. The candidate frame location 150 may cover an area having any of a variety of shapes and sizes. While one candidate frame location 150 is shown in this example, in other examples a frame may have multiple candidate frame locations.

FIG. 1B illustrates a second video frame 111 of the first video, wherein the second video frame 111 is later in the sequence of frames making up the first video, as indicated by movement of the indicator 132 on the video progress bar 130. In this second video frame 111, the content 120 has changed, such that it has moved to a different area in the second frame 111 as compared to the first frame 110. According, candidate frame location 151 may have a different size, shape, and/or position as compared to the candidate frame location 150 in the first frame 110, as the non-essential areas in the second frame are different based on the change in content 120 displayed. Moreover in this example, an additional candidate frame location 152 is available on another portion of the second frame 111, to a left side of the content 120.

Figure 1C:
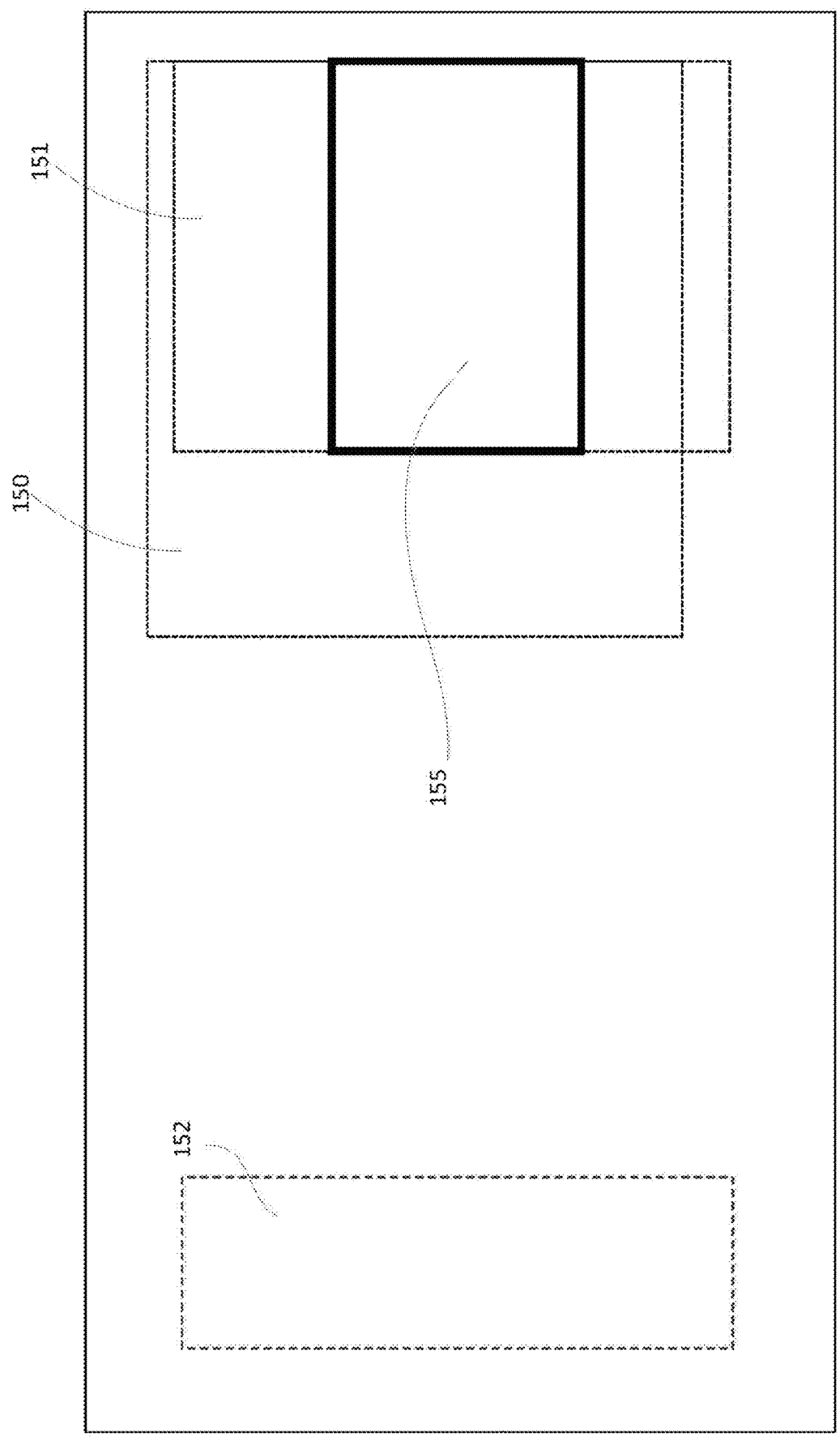
FIG. 1C depicts an example of identifying a candidate video location, for potential insertion of a second video within the first video, based on comparing the candidate frame locations of the various frames, according to aspects of the disclosure.

FIG. 1C illustrates an example of comparing the candidate frame locations 150, 151, 152 among a plurality of frames. While this example illustrates only a few candidate frame locations from a couple frames, the comparison may include any number of candidate frame locations from multiple sequential frames. In comparing the candidate regions, it is determined which regions are consistent among a plurality of sequential frames. In the example shown, region 155 may be consistent across the plurality of sequential frames. Accordingly, region 155 may be identified as a candidate video location for the second video.

Identifying the candidate frame locations in each frame may be performed using any of a variety of techniques. A few examples of such techniques are described below in connection with FIGS. 2-5.

Figure 1D:
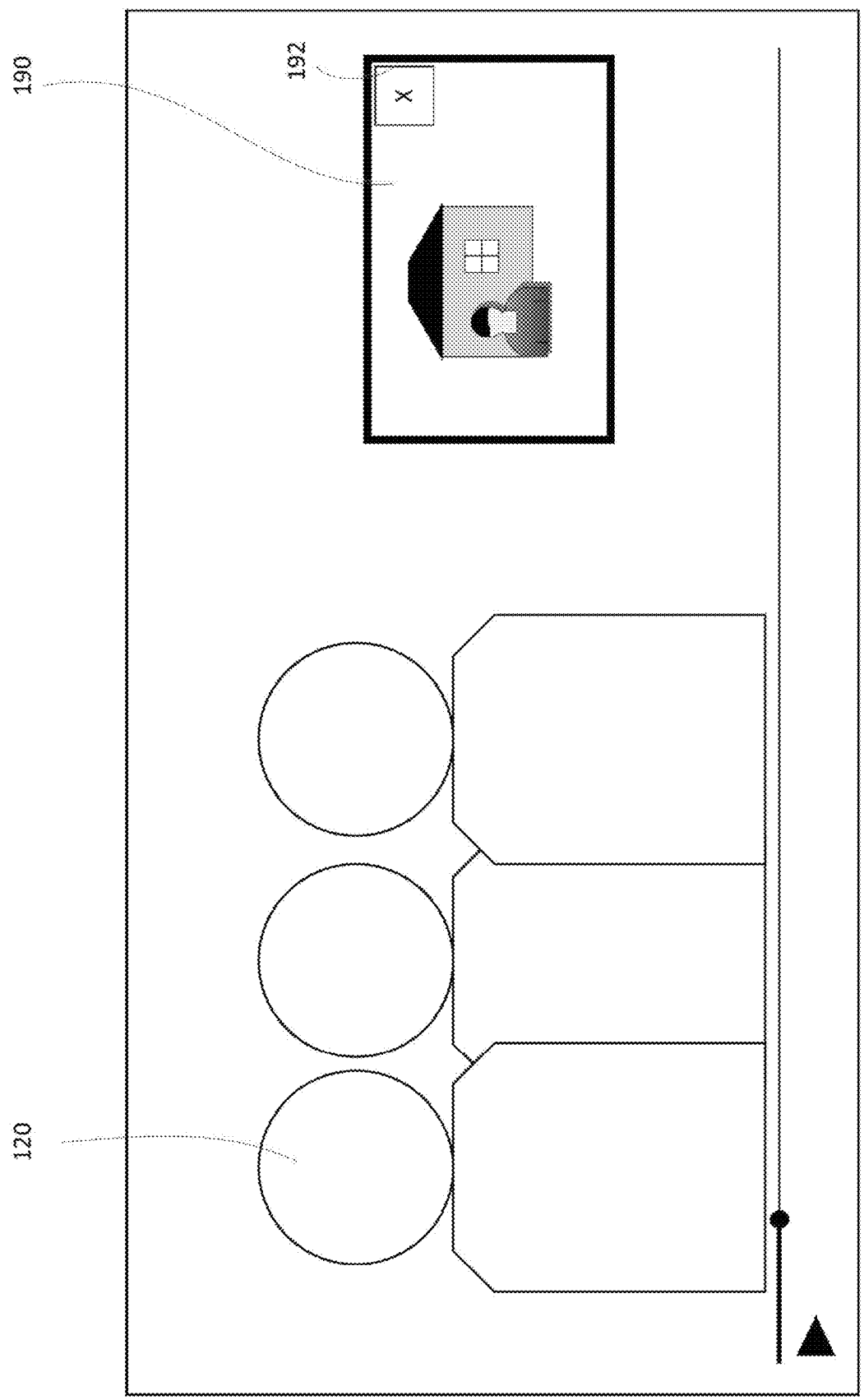
FIG. 1D depicts an example of the second video inserted within the first video for concurrent playback, according to aspects of the disclosure.

FIG. 1D illustrates an example of inserting the second video within the candidate video location identified within the first video. As shown, second video 190 includes second content, which may be different from the content 120 of the first video. The second video 190 may have a duration that is equal to the duration of the first video, or shorter. For example, the duration of the second video may be for a subset of frames of the first video. In some examples, the second video 190 may pop up in the first video, and may automatically disappear when the second video 190 has concluded. In other examples, the second video 190 may include an icon 192 or other interactive element that may be used to close the second video 190, such that only the first video is shown. In further examples, the second video 190 may include other interactive elements, such as controls to adjust a speed of the second video 190, to pause the second video 190, to annotate the second video 190, gaming elements, or the like.

Figure 2A:
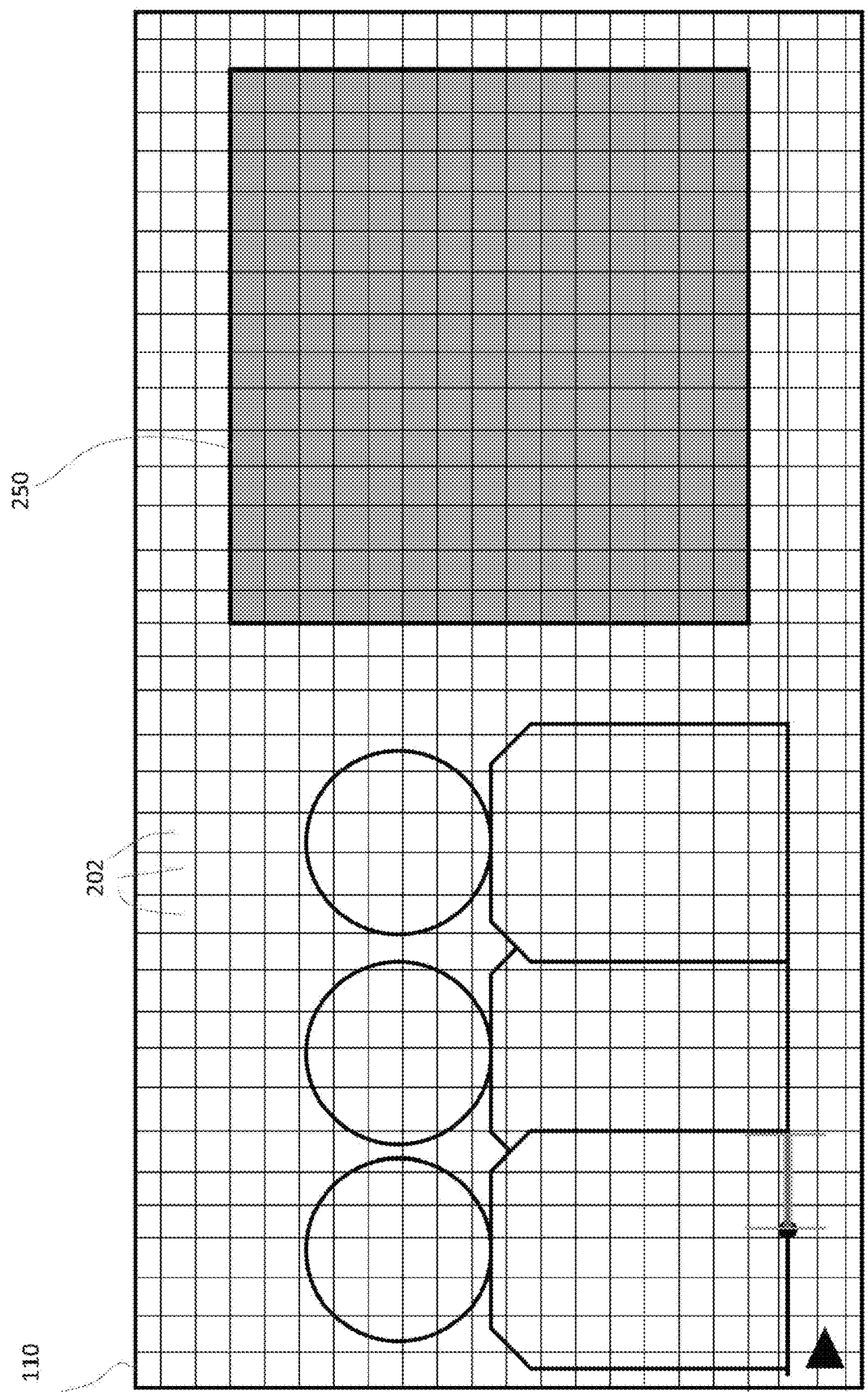
FIGS. 2A-C depict examples of candidate frame locations identified using a grid of cells according to aspects of the disclosure
Figure 2B:
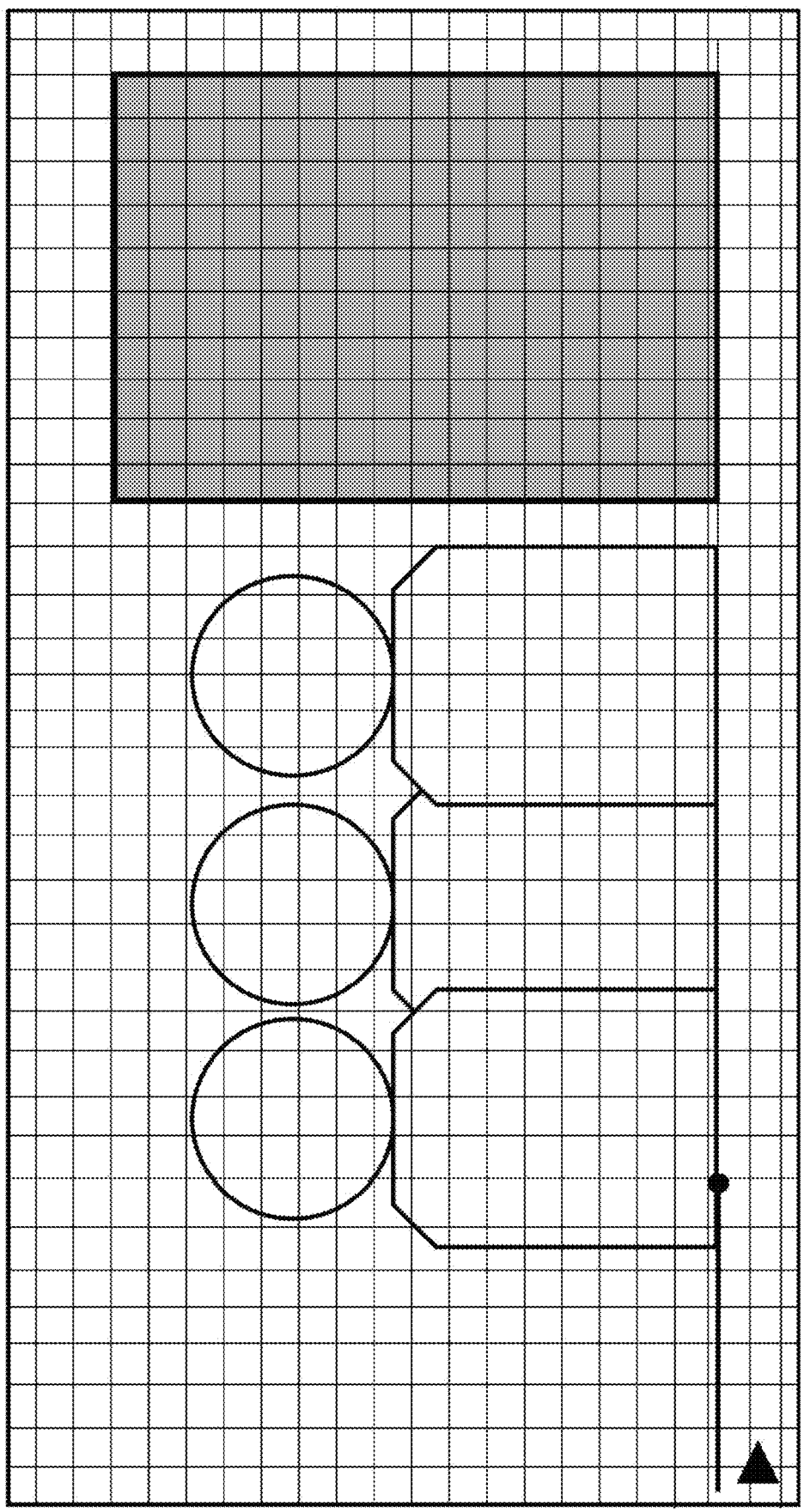
Figure 2C:
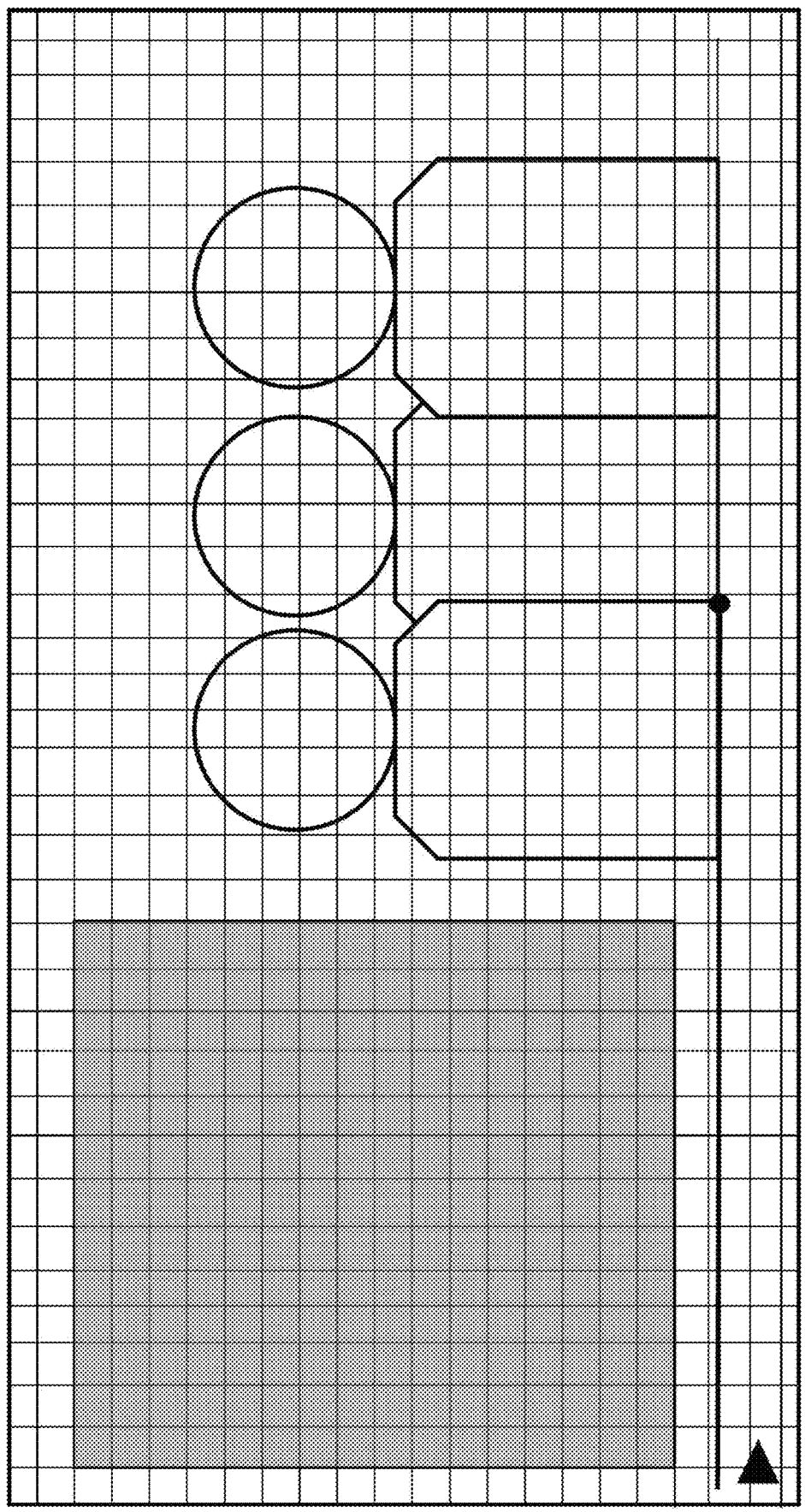

FIGS. 2A-C illustrate an example of a static content detection approach. According to this approach, given a sequence of video-frames, differences are computed between consecutive video frames. Each resulting frame may be split into a grid, and an aggregate difference between the consecutive frames is computed for each cell in the grid.

As shown in FIG. 2A, the first frame 110 is divided into a grid of cells 202. Similarly, as shown in FIGS. 2B-C, frames 111-112 are also divided into a grid of cells. The cells may have a consistent size for each frame in the first video, but the size may vary in analysis of one video from the size in analysis of another video. According to some examples, each cell may be one pixel. In other examples, each cell may include numerous pixels. The cells may be compared across the frames 110-112 to compute differences between the cells. Such differences may include, for example, changes of content depicted in each cell, such as changes in color, lights, objects, etc. Cells having minimal differences from one frame to the next may be considered as corresponding to non-essential areas of the frame. In some examples, cells across frames having minimal differences may be assigned a value, whereas values lower than a threshold indicate potential for inclusion of the cell in a candidate frame location. A collection of adjacent cells all having assigned values below the threshold may form the candidate frame location.

In some examples, computed weights for each pixel, cell, or other area may be used to compute a local average value for every pixel, cell, or other area of the frame. This may blur the image and make the determination of candidate locations less susceptible to noise. For each row of the frame, a longest line length where the local average value does not drop below a first threshold may be stored. For each column of the frame, a largest rectangle where the local average value does not drop below a second threshold may be stored. For each frame, N largest rectangles based on such computation may be stored.

Figure 3:
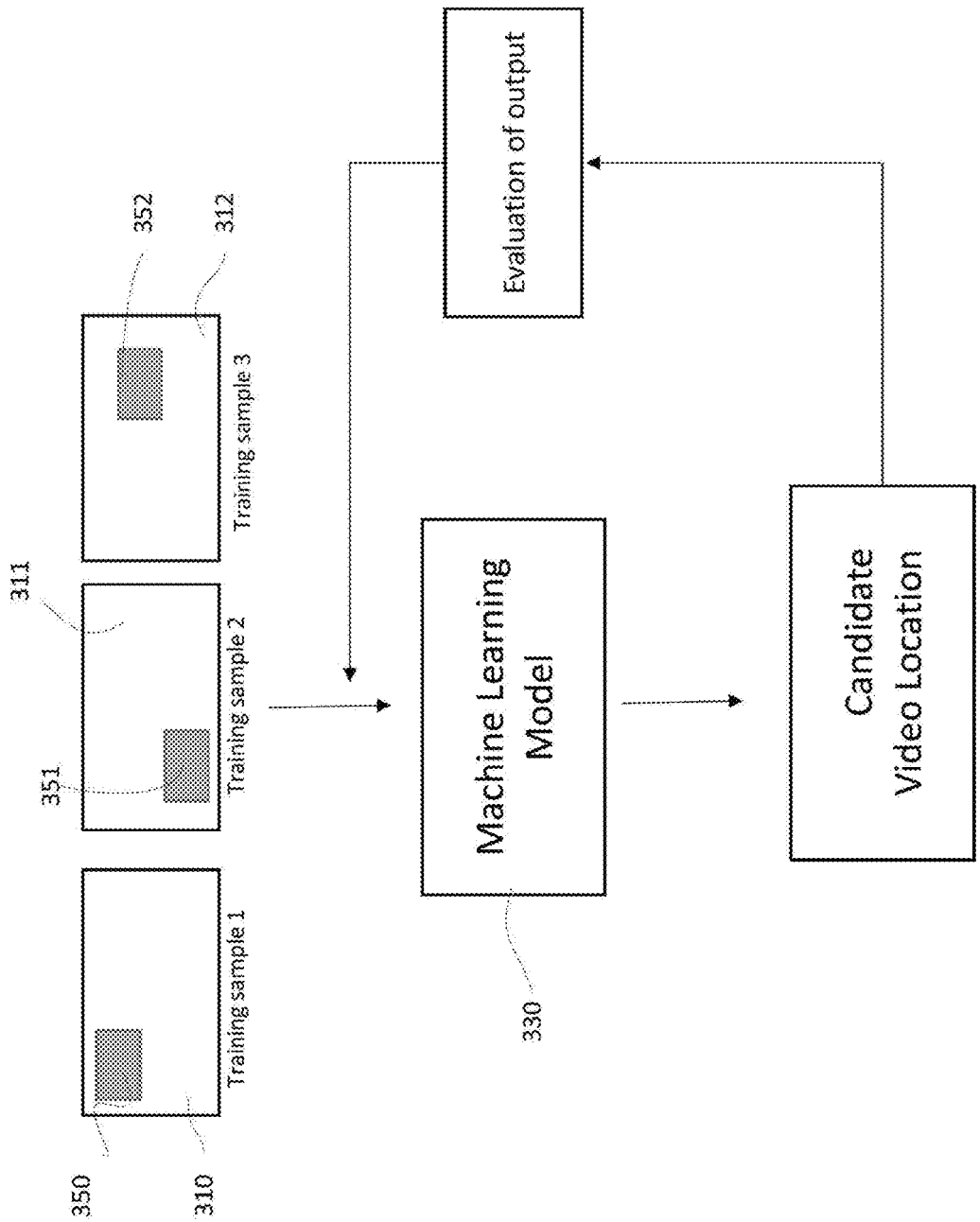
FIG. 3 is a block diagram illustrating training a machine learning model according to aspects of the disclosure.

In some examples, a machine learning model may be used to identify candidate frame locations within each frame, and/or to identify candidate video locations that include candidate frame locations across a plurality of sequential frames. FIG. 3 illustrates an example of training a machine learning model 330.

The machine learning model 330 may be, for example, a neural network, a convolutional neural network, a generalized additive model, or any of a variety of other types of machine learning models. To generate the model, a machine learning engine can obtain feature data and signal data associated with several content item impressions, and train the model using the feature data and corresponding signal data of each of the historical content item impressions. For example, the machine learning engine can be configured with a regression analysis technique that uses a statistical process to estimate the relationship between a feature or combination of features and a signal. The feature or combination of features can be a predictor or independent variable, and the signal can be a dependent variable or a criterion variable that can change as the features are varied. In some cases, the machine learning engine can estimate or determine a conditional expectation of the dependent variable given the independent variables, such as an average value of the dependent variable when the independent variables are fixed, or other parameter or metric of the conditional distribution of the dependent variable or signal given the independent variable or feature. The predicted signal can be a function of the independent variables and can be referred to as a regression function. The machine learning engine can further identify, determine or characterize a variation of the dependent variable around the regression function which can be described by a probability distribution. The machine learning engine can use the probability distribution to generate a confidence score in the predicted signal value, or use the probability distribution as the confidence score.

In the example shown, the machine learning model 330 may be trained using a plurality of training samples 310-312. While only a few training samples are illustrated, it should be understood that any number of training samples may be used. In this example, each training sample 310-312 is tagged with information identifying a candidate frame location 350-352. Such tagging may be performed by a manual process. Tagging may include annotating each frame, such as by drawing or highlighting areas of the frame. In other examples, the tagging may include updating metadata associated with the images to identify locations within the image that are candidate frame locations. For example, the locations may be identified using coordinates, pixel identifiers, or any other information.

The training samples 310-312 may be input to the machine learning model 330. Based on such input, the machine learning model 330 may learn to recognize candidate frame locations. For example, the machine learning model 330 may recognize patterns among the annotated candidate frame locations 350-352 in the training samples 310-312, and learn to detect such patterns in other frames to identify the candidate frame locations. The machine learning model 330 may provide output identifying the candidate frame locations. According to some examples, the output may be evaluated as part of a feedback loop used to update or fine-tune the machine learning model 330.

The model 100 can repeat the training step multiple times, until meeting one or more stopping criteria. The stopping criteria can include, for example, a maximum number of training steps and/or, for supervised learning or semi-supervised learning, iterations of backpropagation, gradient descent, and model parameter update. The stopping criteria can additionally or alternatively define a minimum improvement between training steps. For semi-supervised training, an example can be a relative or absolute reduction in the computed error between output predicted by the model 100 and corresponding ground-truth labels on training data reserved for validation and/or testing. For unsupervised learning, an example loss function can be least squares.

In some examples, the model 100 can be trained for a number of epochs, e.g., 1000 epochs with early stopping where an error between a predicted output and ground-truth error is not improved over 10 epochs. Other stopping criteria can be based on a maximum amount of computing resources allocated for training, for example a total amount of training time exceeded, e.g., wall clock time, or total number of processing cycles consumed, after which training is terminated.

Figure 4:
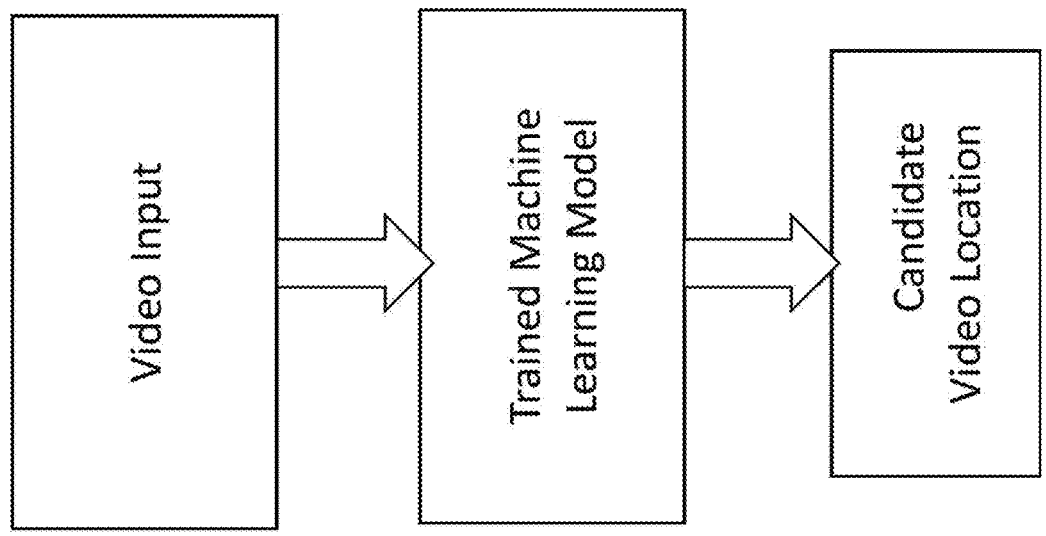
FIG. 4 is a block diagram illustrating executing the machine learning model to identify candidate video locations according to aspects of the disclosure.

As shown in FIG. 4, the trained machine learning model may be used to predict candidate video locations in video inputs. For example, when a video is input, the machine learning model may identify candidate frame locations in a plurality of sequential frames, such as by assessing, for each point on a frame, how likely the point is to be a non-essential location. The machine learning model may further identify candidate video locations based on consistent candidate frame locations across a plurality of sequential frames. Where more than one candidate video locations are detected, the model may identify each candidate video location. According to some examples, multiple candidate video locations may be scored and/or ranked. According to other examples, parameters of the candidate video locations, such as duration, size, etc., may be provided with the output.

According to some examples, machine learning models may be trained to detect other types of information. By way of example, the machine learning model may be trained to predict essential areas in frames, such as areas depicting people, animals, featured objects, or the like. Such essential areas may thus be removed from consideration of candidate frame locations.

Figure 5:
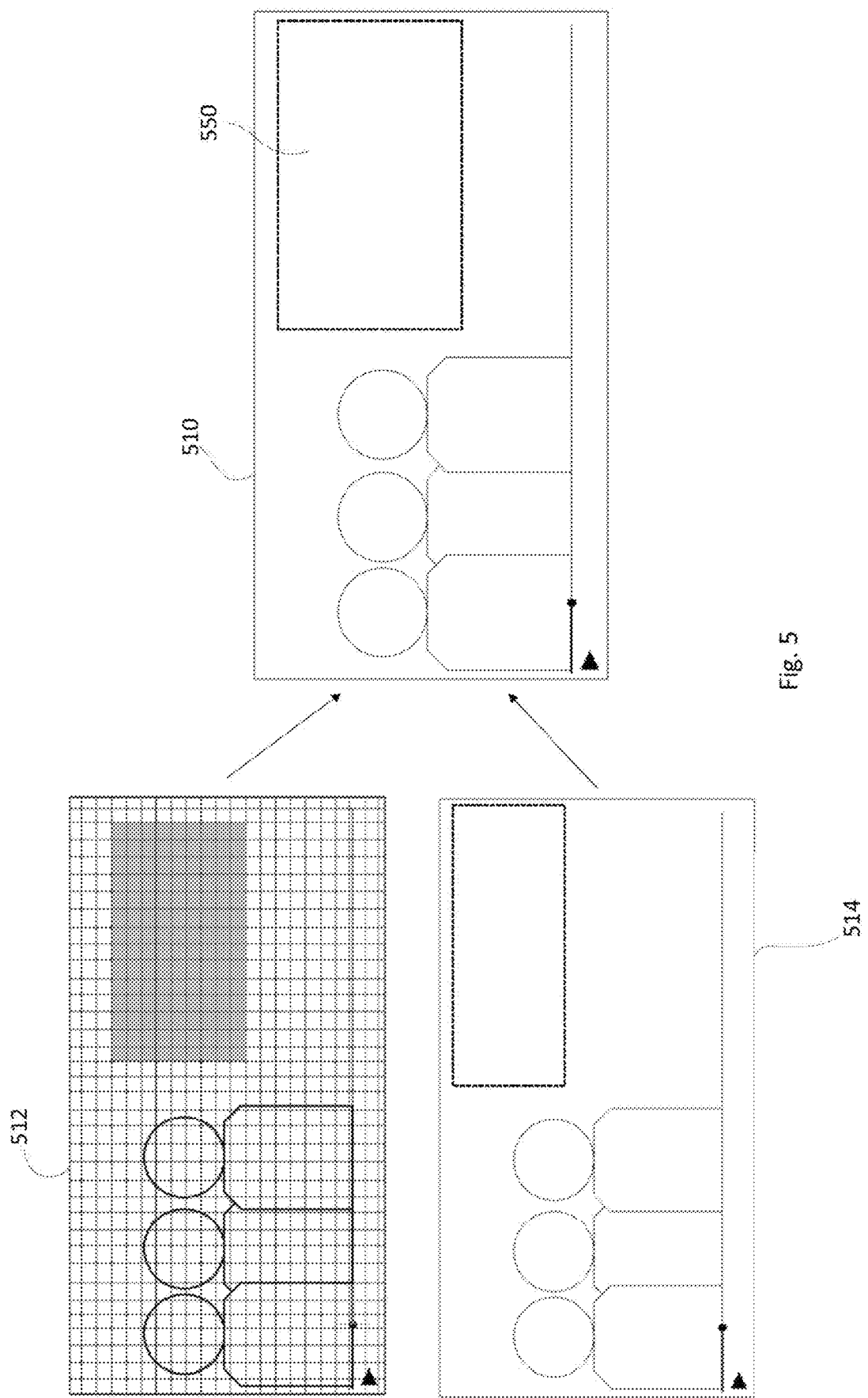
FIG. 5 depicts an example of multiplying weights assigned to a candidate frame locations identified based on different approaches, according to aspects of the disclosure.

In some examples, a hybrid of multiple different approaches may be used. For example, FIG. 5 illustrates one example of a hybrid approach. For example, frame 510 may be evaluated using a combination of two approaches. Frame 512 represents the frame 510 evaluated using the static content detection approach described above in connection with FIGS. 2A-C. Frame 514 represents the frame 510 evaluated using a machine learning model, as described above in connection with FIGS. 3-4. Evaluating the pixels, cells, or areas of the frames 512, 514 under each approach may include assigning a weight to each pixel, cell, or area, wherein the weight indicates a likelihood that the pixel/cell/area is a non-essential area. The weights assigned to a given portion of each frame 512, 514 may be different based on the evaluation technique. For example, a particular pixel in frame 512 may be assigned a weight of value x based on the static content detection evaluation, while the same particular pixel in frame 514 may be assigned a weight of value y based on the machine learning evaluation. In this example, the weights are multiplied together, such that both evaluation techniques are considered. Using the multiplied weight for each pixel/cell/area, candidate frame location 550 can be identified for the frame 510.

Figure 6:
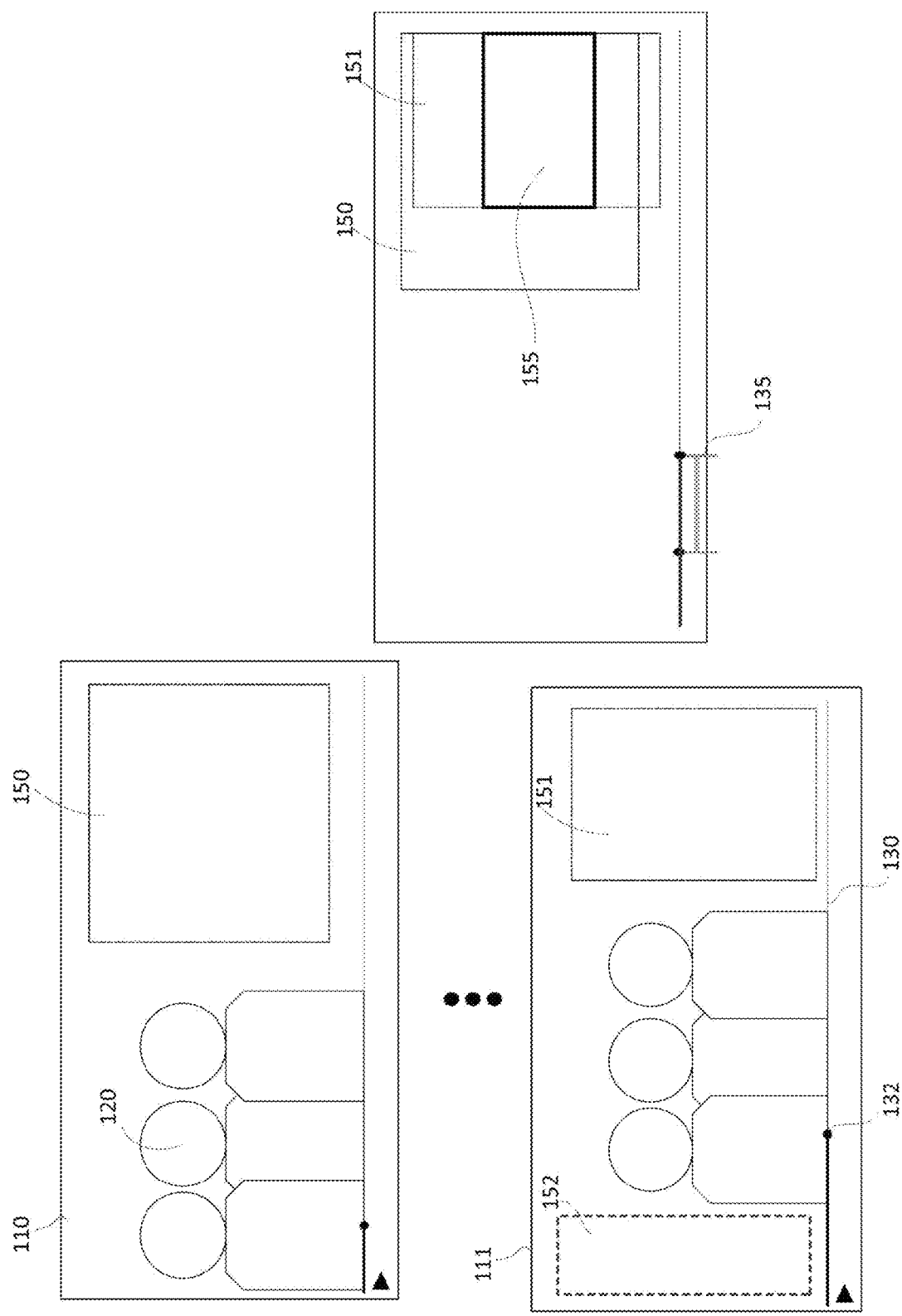
FIG. 6 depicts an example of identifying the candidate video locations based on the candidate frame locations, according to aspects of the disclosure.

Candidate video locations for the second video may be identified within the first video using the candidate frame locations. FIG. 6 illustrates an example of identifying the candidate video locations based on the candidate frame locations. A first candidate frame location 150 for the video frame 110 may be identified. For example, the candidate frame location 150 may determined by comparing pixels or other subportions of the frame with corresponding pixels or subportions in more or more adjacent frames. Weights may be assigned to each pixel or other subportion based on a degree of difference between the frames. In some examples, computed weights for each pixel, cell, or other area may be used to compute a local average value for every pixel, cell, or other area of the frame. For each row of the frame, a longest line length where the local average value does not drop below a first threshold may be stored. For each column of the frame, a largest rectangle where the local average value does not drop below a second threshold may be stored. For each frame, N largest rectangles based on such computation may be stored. Second video frame 111 of the first video is similarly analyzed, wherein the second video frame 111 is later in the sequence of frames making up the first video. Moreover, each frame between the first and second frames may be similarly analyzed to determine the N largest rectangles in each frame. The N largest rectangles in each frame may be compared to determine which locations in the frame are consistent across the rectangles for at least a subportion of the first video. According to some examples, slight inconsistencies may be tolerated, such as if one or more frames within a sequence has a small deviation with respect to the N largest rectangles. In this example, candidate video location 155 represents the region that was consistently within the N largest rectangles within each of the frames in the sequence corresponding to a span of time 135.

The second video to be inserted or overlaid on the first video may in some examples be selected from a plurality of videos. By way of example, the second video may be an advertisement to be inserted in the first video. The first video may be, for example, streamed content. A variety of advertisements may be available. In some examples, different advertisements may be selected for each playback of the streamed content, by a same user or different users.

Figure 7:
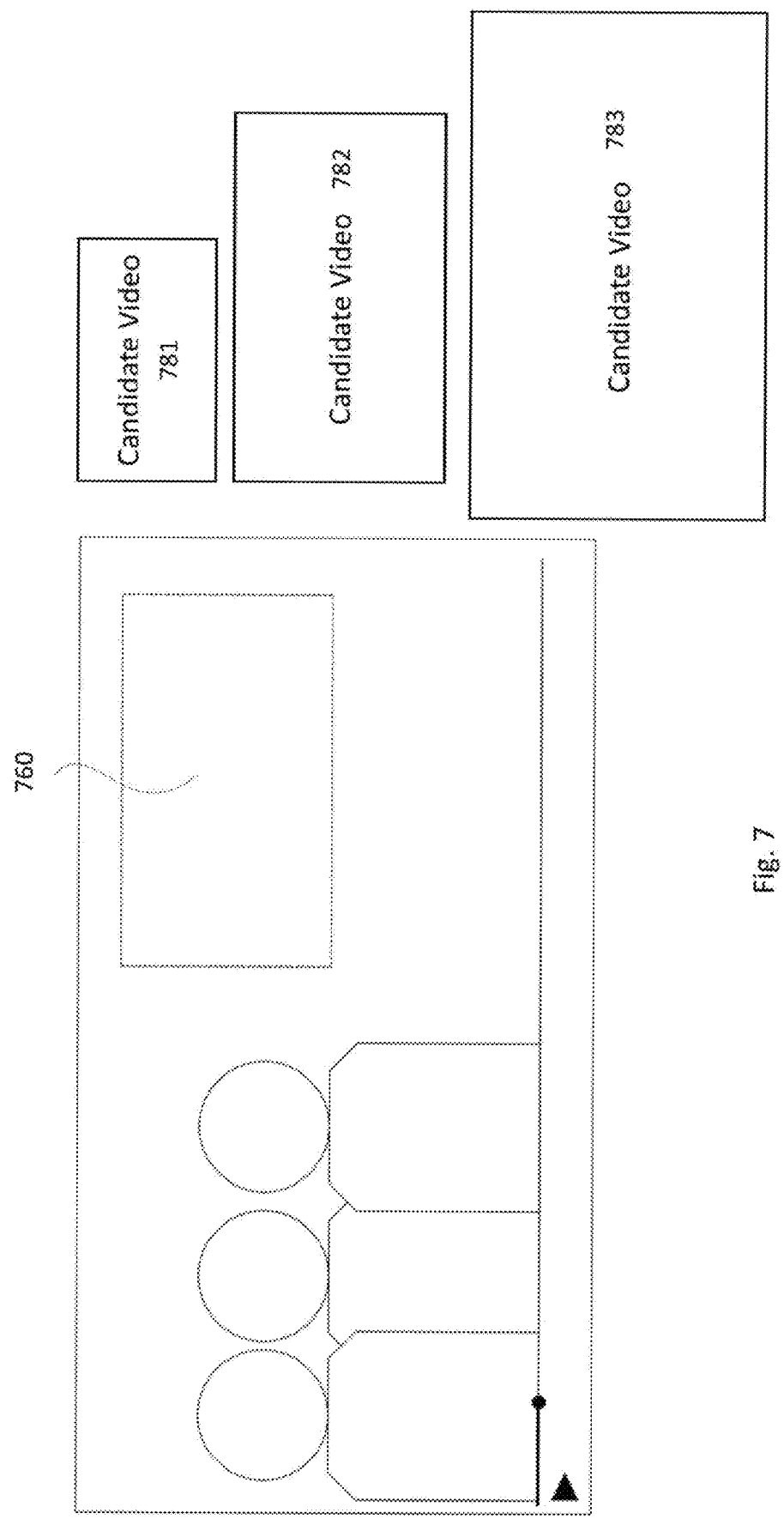
FIG. 7 illustrates an example of selecting a second video based on parameters of a candidate video location according to aspects of the disclosure.

FIG. 7 illustrates an example where the second video is selected based on size. For example, candidate video location 760 may have a defined size and shape. Candidate second videos 781, 782, 783 may each have a different size. Some of the candidate second videos, such as candidate second video 783, may be larger in size than the candidate video location 760. Such larger second videos may be excluded from selection, as they would cover portions of the first video beyond the defined candidate location 760. As candidate second videos 781, 782 would each fit, either may be selected. According to some examples, the larger second video 782 may be selected in order to utilize the most of the candidate video location 760.

Figure 8:
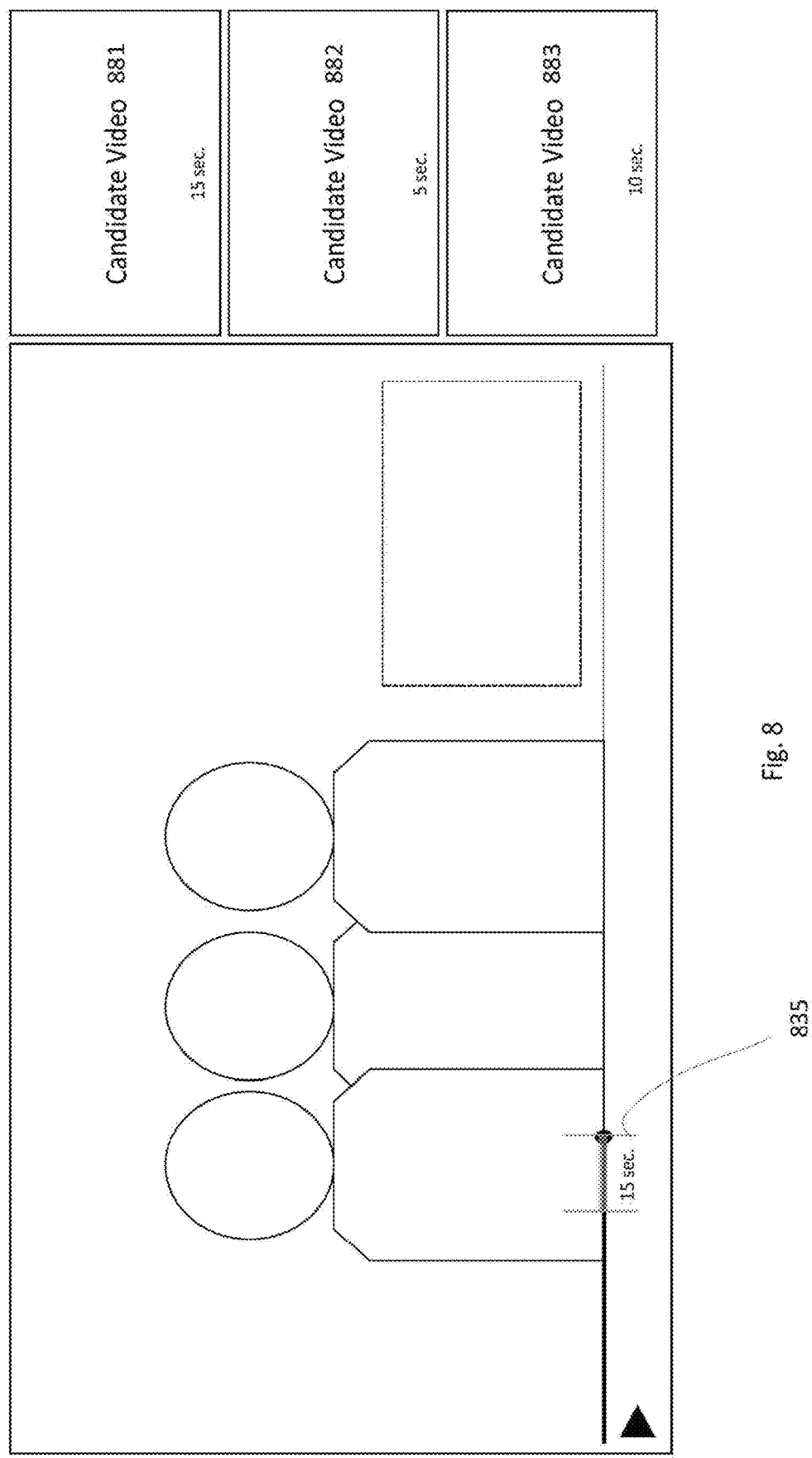
FIG. 8 illustrates another example of selecting a second video based on parameters of a candidate video location according to aspects of the disclosure.

FIG. 8 depicts an example of selecting a second video based on a length of time for which the candidate video location is available within the first video. As shown, the candidate video location in the first video has a duration 835 of 15 seconds. According one of candidate second videos 881-883 having a duration equal to or less than 15 seconds may be selected. Other second videos having longer durations may be excluded.

Figure 9:
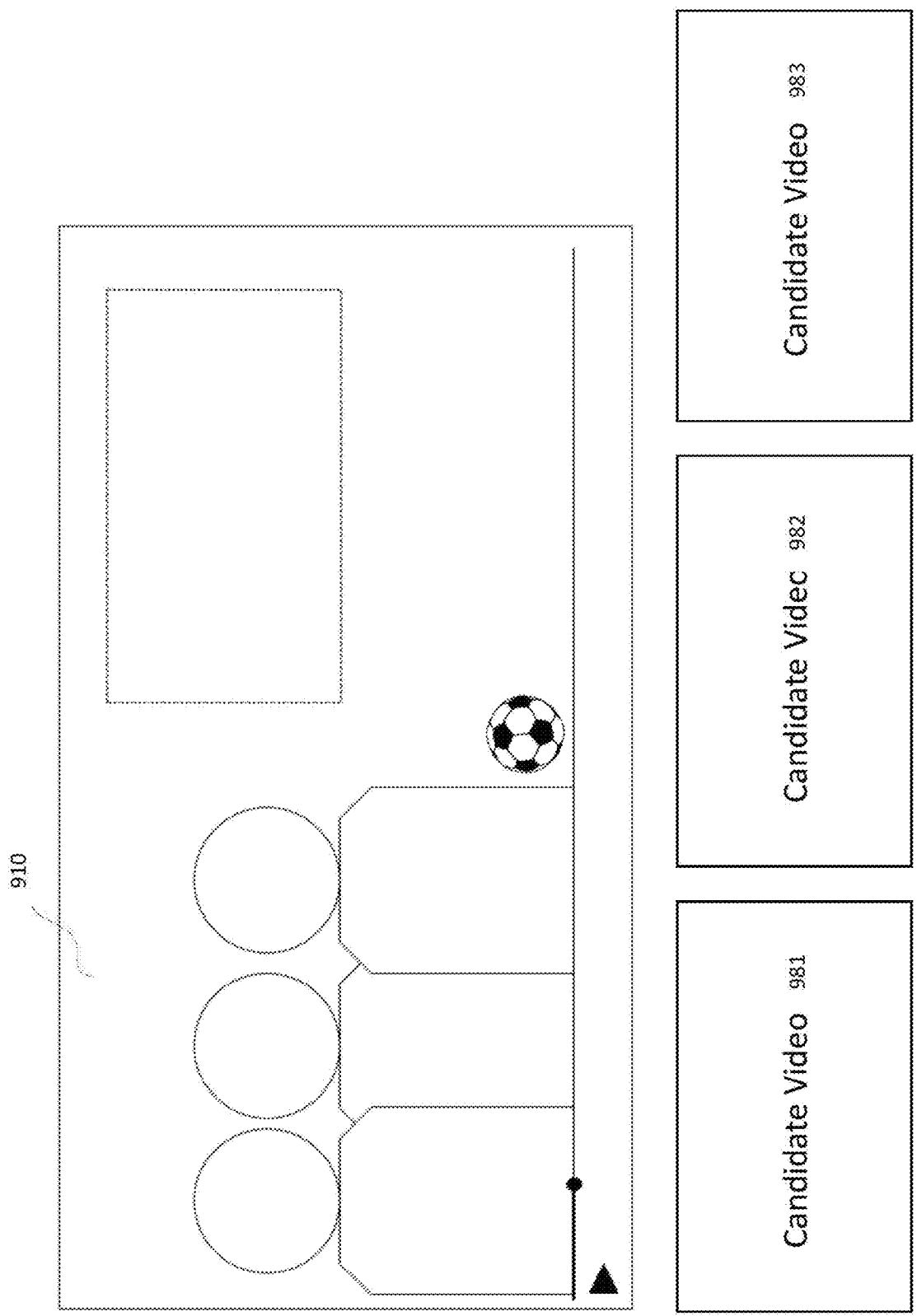
FIG. 9 illustrates another example of selecting a second video based on parameters of a candidate video location according to aspects of the disclosure

FIG. 9 illustrates an example of selecting the second video based on the context of the first video. The context may be determined relevant to the specific frames of the first video in which the second video will be inserted, or it may be determined relevant to other portions or an entirety of the first video. According to some examples, the frames of the first video may be annotated with relevant context tags. The tagging may be performed manually, using image or object recognition techniques, using machine learning, etc. Such context tags may indicate the content in the frame is relevant to a particular theme, subject matter, object, etc. For example, the context tags can indicate that the frame is relevant to a particular sport, action, product, state of mind, etc. Candidate second videos 981-983 may also have relevant tags assigned. One of the second candidate videos 981-983 may be selected based on a number of overlapping tags. For example, the second video having the greatest number of tags that match or correspond to tags of the first video may be selected. In the example shown, frame 910 which include the candidate video location relates to soccer, and thus may be tagged with indicators such as soccer, sports, fields, outdoors, athletics, determination, motivating, practice, etc. Candidate second video 981 may relate to cooking, and therefore be tagged with food, cooking, utensils, pasta, butter, etc. Candidate second video 982 may relate to sneakers, and may be tagged with sports, athletics, comfort, style, blue, etc. Candidate second video 983 may relate to furniture, and may be tagged with wood, mahogany, traditional, luxury, etc. Because the candidate second video 982 included at least two tags that overlapped with the first video's tags-sports and athletics—the candidate second video 982 may be selected for inclusion in the candidate video location.

While size, duration, and context are illustrated separately in the above examples, the second video can be selected based on a combination of these and/or other parameters. The parameters can be used to dynamically select a second video for insertion in the first video.

Figure 10:
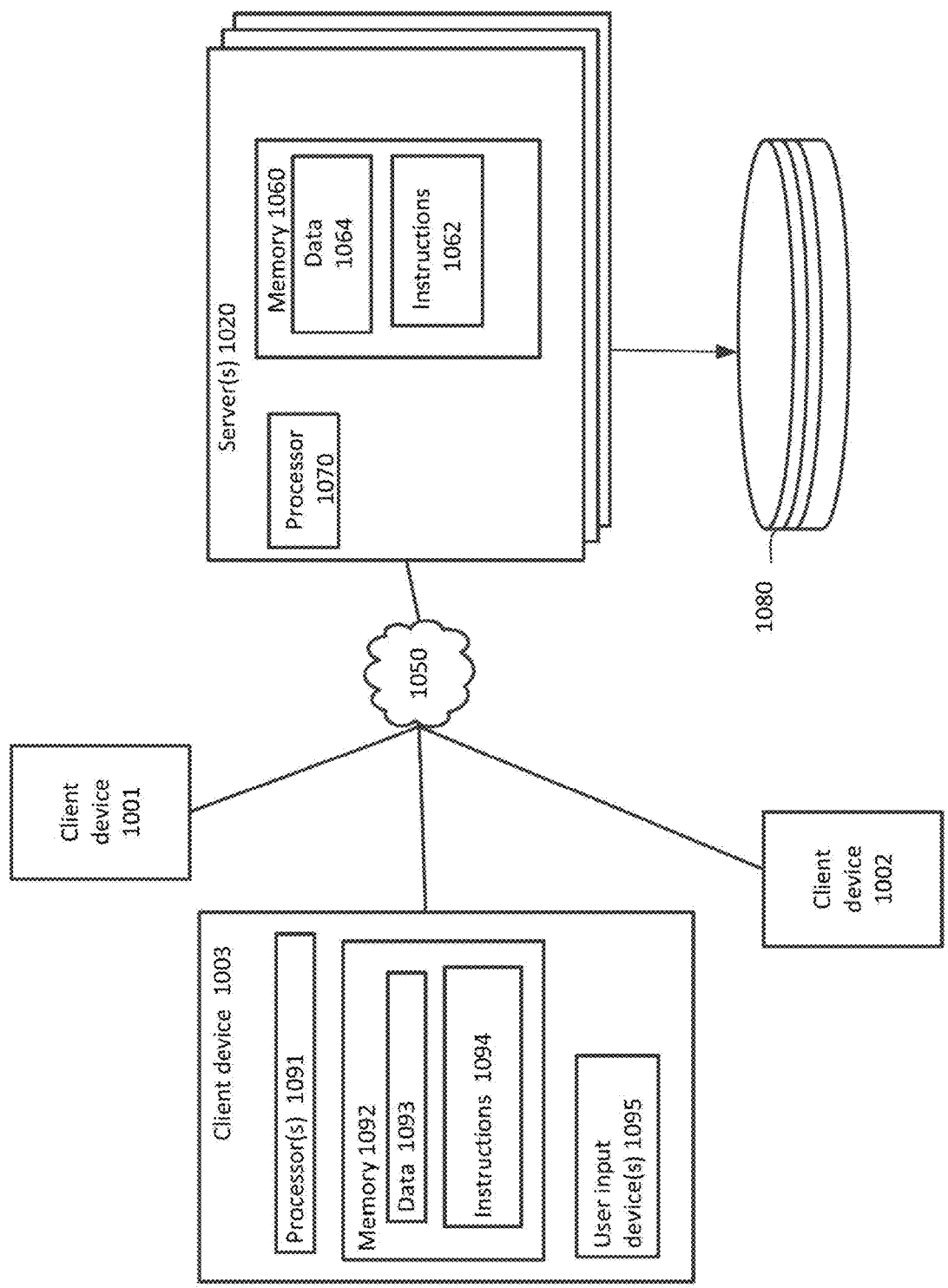
FIG. 10 is a block diagram illustrating an example system according to aspects of the disclosure.

FIG. 10 illustrates an example system for implementing the candidate video location identifier and selection of the second video. In particular, the system includes one or more client devices 1001, 1002, 1003 in communication with one or more servers 1020 through a network 1050. For example, each of a number of different client devices 1001-1003 may receive first video content from the server 1020. The server may determine where second videos can be inserted in the first video for minimal disruption during simultaneous playback, and may select the second video to be inserted. While several client devices 1001-503 are shown, it should be understood that any number of client devices may communicate with the one or more servers 1020 through the network 1050.

The server 1020 includes one or more processors 1070. The processors 1070 can be any conventional processors, such as commercially available CPUs. Alternatively, the processors can be dedicated components such as an application specific integrated circuit ("ASIC") or other hardware-based processor. Although not necessary, the server 1020 may include specialized hardware components to perform specific computing processes.

The memory 1060 can store information accessible by the processor 1070, including instructions that can be executed by the processor 1070 and that can be retrieved, manipulated or stored by the processor 1070.

The instructions can be a set of instructions executed directly, such as machine code, or indirectly, such as scripts, by the processor 1070. In this regard, the terms "instructions," "steps" and "programs" can be used interchangeably herein. The instructions can be stored in object code format for direct processing by the processor 1070, or other types of computer language including scripts or collections of independent source code modules that are interpreted on demand or compiled in advance. Functions, methods, and routines of the instructions are explained in more detail in the foregoing examples and the example methods below.

The data can be retrieved, stored or modified by the processor 1070 in accordance with the instructions. The data can also be formatted in a computer-readable format such as, but not limited to, binary values, ASCII or Unicode. Moreover, the data can include information sufficient to identify relevant information, such as numbers, descriptive text, proprietary codes, pointers, references to data stored in other memories, including other network locations, or information that is used by a function to calculate relevant data.

Although FIG. 10 functionally illustrates the processor, memory, and other elements of server 1020 as being within the same block, the processor, computer, computing device, or memory can actually comprise multiple processors, computers, computing devices, or memories that may or may not be stored within the same physical housing. For example, the memory can be a hard drive or other storage media located in housings different from that of the server 1020. Accordingly, references to a processor, computer, computing device, or memory will be understood to include references to a collection of processors, computers, computing devices, or memories that may or may not operate in parallel. For example, the server 1020 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The memory 1060 can store information accessible by the processor 1070, including instructions 1062 that can be executed by the processor 1070. Memory can also include data 1064 that can be retrieved, manipulated or stored by the processor 1070. The memory 1060 may be a type of non-transitory computer readable medium capable of storing information accessible by the processor 1070, such as a hard-drive, solid state drive, tape drive, optical storage, memory card, ROM, RAM, DVD, CD-ROM, write-capable, and read-only memories. The processor 1070 can be a well-known processor or other lesser-known types of processors. Alternatively, the processor 1070 can be a dedicated controller such as an ASIC.

The instructions 1062 can be a set of instructions executed directly, such as machine code, or indirectly, such as scripts, by the processor 1070. In this regard, the terms "instructions," "steps" and "programs" can be used interchangeably herein. The instructions 1062 can be stored in object code format for direct processing by the processor 1070, or other types of computer language including scripts or collections of independent source code modules that are interpreted on demand or compiled in advance. The instructions 1062 may be executed to identify regions in a sequence of video frames for inserting a second video, as described above. The instructions 1062 may further be executed to select a second video for insertion into or overlay on the first video during simultaneous playback of the first and second videos.

The data 1064 can be retrieved, stored or modified by the processor 1070 in accordance with the instructions 1062. For instance, although the system and method is not limited by a particular data structure, the data 1064 can be stored in computer registers, in a relational database as a table having a plurality of different fields and records, or XML documents. The data 1064 can also be formatted in a computer-readable format such as, but not limited to, binary values, ASCII or Unicode. Moreover, the data 1064 can include information sufficient to identify relevant information, such as numbers, descriptive text, proprietary codes, pointers, references to data stored in other memories, including other network locations, or information that is used by a function to calculate relevant data.

The servers 1020 may be further coupled to an external storage 1080, such as a database. The external storage 1080 may store content for delivery to the client devices 1001-1003. The external storage 1080 may further store banners for rendering at the client devices 1001-1003 along with the content. Such banners may include advertisements or other information. While the external storage 1080 is shown as a single database, it should be understood that the physical structure of the external storage 1080 can include multiple storage devices, wherein such multiple devices may be in communication with each other such as in a distributed storage system.

Each client device 1001, 1002, 1003 may be configured similarly to one another and to the servers 1020 in that they include a processor 1091 and memory 1092 including data 1093 and instructions 1094 executable by the processor 1091. The structure of the processor 1091 and memory 1092 may be similar to that of the processor 1070 and memory 1060, respectively, described above. The client devices 1001-1003 may be any type of personal computing devices, such as laptops, desktop computers, tablets, gaming consoles, phones, augmented reality or virtual reality headsets, smartwatches, smartglasses, home assistant hubs, or any other computing device including a display for outputting content along with one or more banners. Each client device 1001-1003 may further include one or more user input devices 1095. Such user input devices 1095 may include touchscreens, touchpads, keypads, cameras, microphones, joysticks, or any other device adapted to capture input signals from a user.

Further to the example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

FIG. 11 illustrates an example method for determining placement of a second video within a first video. The method may be performed by, for example, a computing device or module, or a system of one or more distributed server processes. While the operations are described in a particular order, it should be understood that the order may be modified. Moreover, operations may be performed simultaneously, and operations may be added or omitted.

In block 1110, candidate frame locations are identified within each frame of a plurality of sequential frames within a first video.

In block 1120, the candidate frame locations are compared among sequential frames. The comparisons determine where within a sequence of frames there is a consistent frame location for a second video. The identified candidate frame locations may be provided with a weight corresponding to a confidence level that the location contains a nonessential area.

In block 1130, the candidate video location is selected based on the candidate frame locations, such as by identifying portions of the frames that consistently include candidate frame locations across multiple adjacent frames.

In block 1140, the second video is selected based on a plurality of parameters including but not limited to, size, length, context etc. Once a candidate video location and candidate frame location is determined it elicits certain parameters that must be met by the second video. There are additional parameters that must also may be met that may be set forth by, for example, an ad provider or a video provider.

In block, 1150 the selected video is inserted within the selected video location and selected frame range. A second video may then be played concurrently with the first video.

While some examples described above refer to overlaying a video advertisement on a video for concurrent playback, the techniques described above may similarly be applied for other types of videos to be overlaid on the first video for concurrent playback.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as", "including" and the like, should not be interpreted as limiting the subject matter of the claims to the specific examples; rather, the examples are intended to illustrate only one of many possible examples. Further, the same reference numbers in different drawings can identify the same or similar elements.

The invention claimed is:

1. A method of placing a second video within a first video, comprising:
    identifying, with one or more processors, candidate frame locations within a sequence of frames within the first video, wherein identifying the candidate frame locations comprises, for each frame:
    computing a local average value for every pixel;
    for each row of the frame, storing a longest line length where the local average value remains above a first threshold; and
    for each column of the frame, storing a largest rectangle where the local average value remains above a second threshold;
    comparing, with the one or more processors, the candidate frame locations among the frames in the sequence of frames;
    selecting, with the one or more processors, a candidate video location based on the comparing, the candidate video location comprising a frame location that is consistent among the candidate frame locations in the sequence of frames;
    selecting a second video, based on one or more parameters associated with the candidate video location; and
    inserting the second video within the candidate video location of the first video for concurrent playback with the first video.

2. The method of claim 1, wherein identifying the candidate frame locations comprises identifying two-dimensional locations wherein a difference between content displayed in a first frame in the two-dimensional location and content displayed in a second frame in the two-dimensional location is below a threshold.

3. The method of claim 2, further comprising splitting each frame into a grid comprising a plurality of cells, wherein the two-dimensional locations comprise a subset of the plurality of cells.

4. The method of claim 1, further comprising identifying the stored rectangles having an area larger than a minimum area required by the second video.

5. The method of claim 1, further comprising identifying one or more sequences of stored rectangles having a continuous location in the first video across at least N consecutive frames.

6. The method of claim 5, further comprising computing a weight for each sequence of stored rectangles, wherein selecting the candidate video location is based on the weight.

7. The method of claim 1, further comprising: storing the candidate video location; and
    dynamically selecting the second video during playback of the first video based on at least one of size or duration of the candidate video location.

8. The method of claim 1, wherein the second video is selected from a plurality of candidate videos based on a duration of the candidate video location in the sequence of frames and a duration of the second video.

9. The method of claim 1, further comprising identifying a context of the first video, and selecting the second video from a plurality of candidate videos based on a context of the second video corresponding to the identified context of the first video.

10. The method of claim 9, further comprising annotating the first video with a first tag corresponding to the identified context, wherein selecting the second video comprises identifying a second tag for the second video that overlaps with the first tag.

11. The method of claim 10, wherein annotating the first video with a first tag comprises annotating the first video with tags relevant to an entirety of the first video.

12. The method of claim 10, wherein annotating the first video with a first tag comprises annotating the first video with tags relevant to individual moments or frames within the first video.

13. The method of claim 1, wherein identifying and comparing the candidate frame locations comprises executing a machine learning model.

14. The method of claim 13, further comprising training the machine learning model, the training comprising:
collecting training samples, the training samples comprising a set of frames in the first video that contain annotated sequences of non-essential areas; and
inputting the training samples to a deep-neural network classifier, thereby training the classifier to assess for each point on the set of frames how likely each point is a non-essential location.

15. The method of claim 13, wherein the machine learning model is trained to identify the existence of a human in the video, and to exclude locations in a frame that include the human from the candidate frame locations.

16. A system comprising
memory; and
one or more processors in communication with the memory, the one or more processors configured to:
identify candidate frame locations within sequence of frames within the first video;
compare the candidate frame locations among the frames in the sequence of frames, wherein in identifying candidate frame locations the one or more processors are further configured to, for each frame:
compute a local average value for every pixel;
for each row of the frame, store a longest line length where the local average value remains above a first threshold; and
for each column of the frame, store a largest rectangle where the local average value remains above a second threshold;
select a candidate video location based on the comparing, the candidate video location comprising a frame location that is consistent among the candidate frame locations in the sequence of frames;
select a second video based on one or more parameters associated with the candidate video location; and
insert the second video within the candidate video location of the first video for concurrent playback with the first video.

17. The system of claim 16, wherein the candidate frame locations comprise two-dimensional locations wherein a difference between content displayed in a first frame in the two-dimensional location and content displayed in a second frame in the two-dimensional location is below a threshold.

18. The system of claim 16, wherein the second video is selected from a plurality of candidate videos based on a duration of the candidate video location in the sequence of frames and a duration of the second video.

19. A non-transitory computer-readable medium storing instructions executable by one or more processors for performing a method comprising:
identifying candidate frame locations within a sequence of frames within the first video;
comparing the candidate frame locations among the frames in the sequence of frames, wherein in identifying candidate frame locations the one or more processors are further configured to, for each frame:
compute a local average value for every pixel;
for each row of the frame, store a longest line length where the local average value remains above a first threshold; and
for each column of the frame, store a largest rectangle where the local average value remains above a second threshold;
selecting a candidate video location based on the comparing, the candidate video location comprising a frame location that is consistent among the candidate frame locations in the sequence of frames;
selecting a second video, based on one or more parameters associated with the candidate video location; and
inserting the second video within the candidate video location of the first video for concurrent playback with the first video.

\* \* \* \* \*